Aug. 18, 1925.

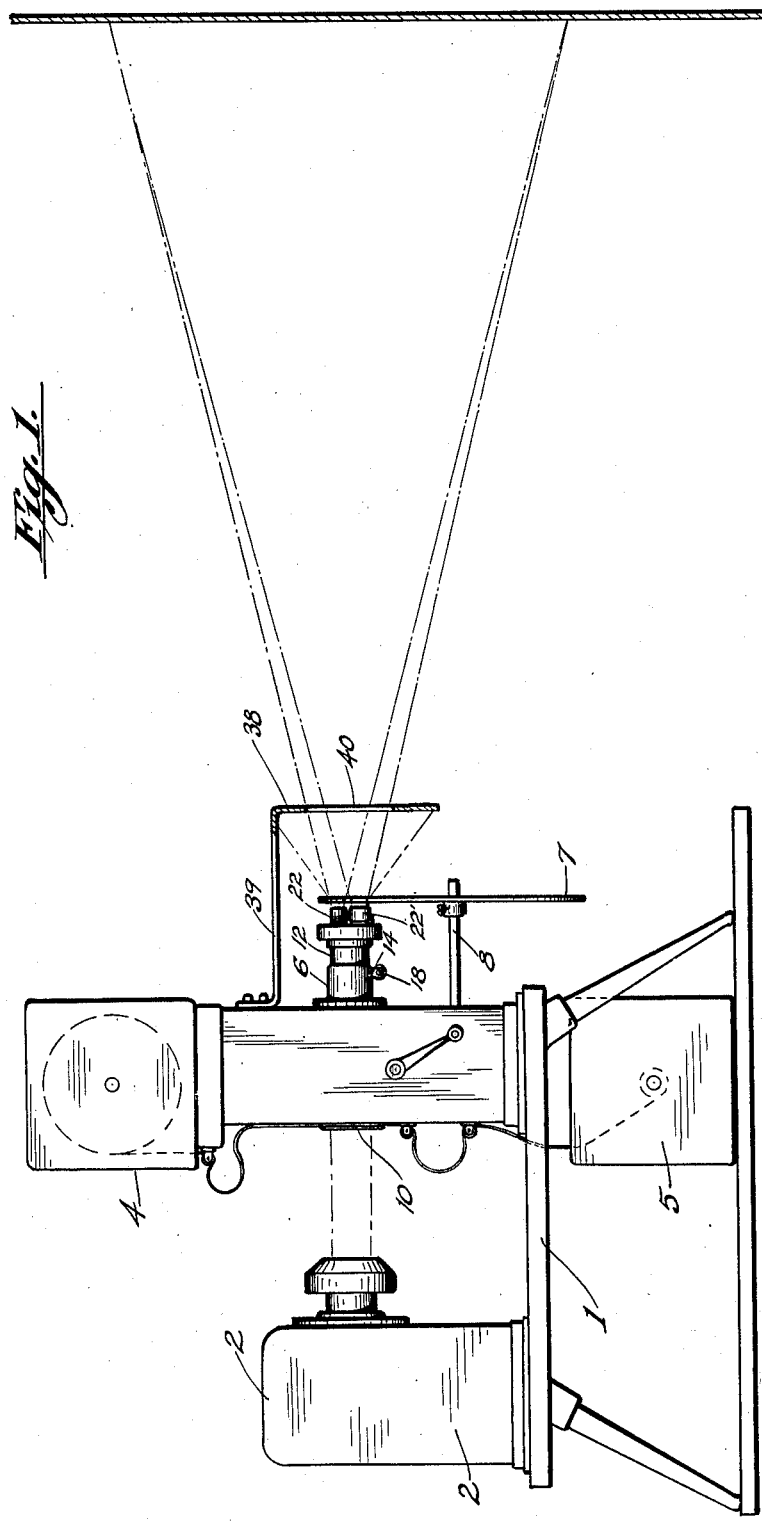

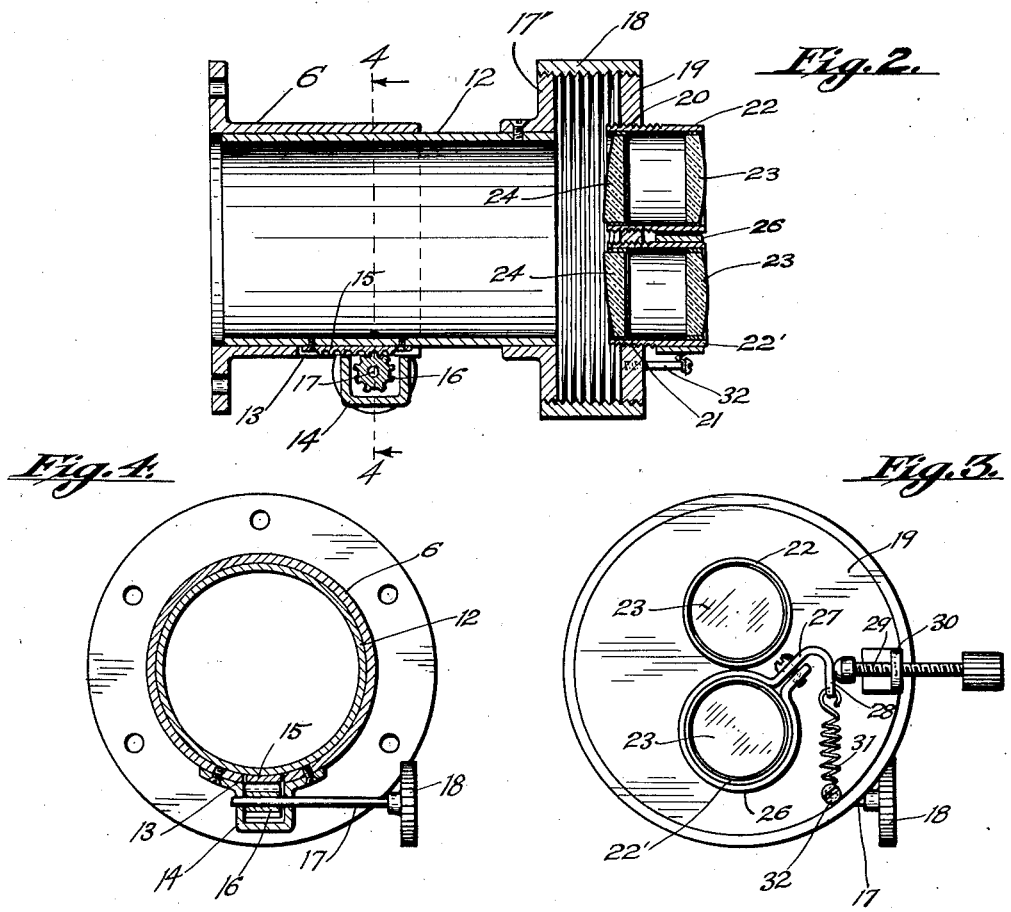

J. E. LEONARD 1,550,214

STEREOSCOPIC PROJECTING APPARATUS

Filed Nov. 10, 1921      3 Sheets-Sheet 3

Inventor:
John E. Leonard.
By Hazard & Miller
Attorneys

Patented Aug. 18, 1925.

1,550,214

UNITED STATES PATENT OFFICE.

JOHN E. LEONARD, OF HOLLYWOOD, CALIFORNIA, ASSIGNOR TO EDWARD H. MARTIN, OF LOS ANGELES, CALIFORNIA.

STEREOSCOPIC PROJECTING APPARATUS.

Application filed November 10, 1921. Serial No. 514,227.

*To all whom it may concern:*

Be it known that I, JOHN E. LEONARD, a citizen of the United States, residing at Hollywood, in the county of Los Angeles and State of California, have invented new and useful Improvements in Stereoscopic Projecting Apparatus, of which the following is a specification.

This invention relates to stereoscopic projecting apparatus and has for its object the provision of means whereby stereoscopic effects may be obtained in the projection of a usual moving picture film strip.

Primarily, the invention consists in the provision of means for alternately projecting different individual frames of a film strip in superimposed relation a plurality of times between successive advances of the film strip.

Each frame of the film strip is advanced sixteen times per second as in the usual practice, and during each successive exposure between successive advances, different individual frames of the film strip are alternately projected upon the screen in superimposed relation seven times, more or less. Thus it will be seen that during the projection of successive frames of the film strip for producing the moving effect incident to the change in the action from one individual frame to the next, different ones of the individual frames having such changes in the action are alternately projected upon the screen in superimposed relation at a speed much greater than normal. As a result, the eye will see first one and then the other of the different individual frames during each change in the projected film for producing the moving effect.

The different individual frames thus alternately projected will have variations in the action shown thereby so that a portion of the background shown in one of said frames will be masked by the action in the other of said individual frames. As a result of the rapid alternation in the projection of said individual frames, said portions of the background will be alternately exposed and masked by the action. As a result the action will appear in relief in front of the background for producing a stereoscopic effect in the picture as projected upon the screen.

In practice two immediately adjacent frames of a film strip are thus alternately projected between advances of the film strip relative to the projecting means, and after each advance of the film strip the second one of said two next adjacent individual frames and the next following individual frame of the strip are similarly alternately projected.

The invention will be readily understood from the following description of the accompanying drawings, in which—

Fig. 1 is a side elevation of a projecting apparatus constructed in accordance with the invention.

Fig. 2 is a longitudinal section through the projecting lenses and their mounting.

Fig. 3 is a front elevation of the projecting lens.

Fig. 4 is a transverse section on the line 4—4 of Fig. 2.

Figure 5:
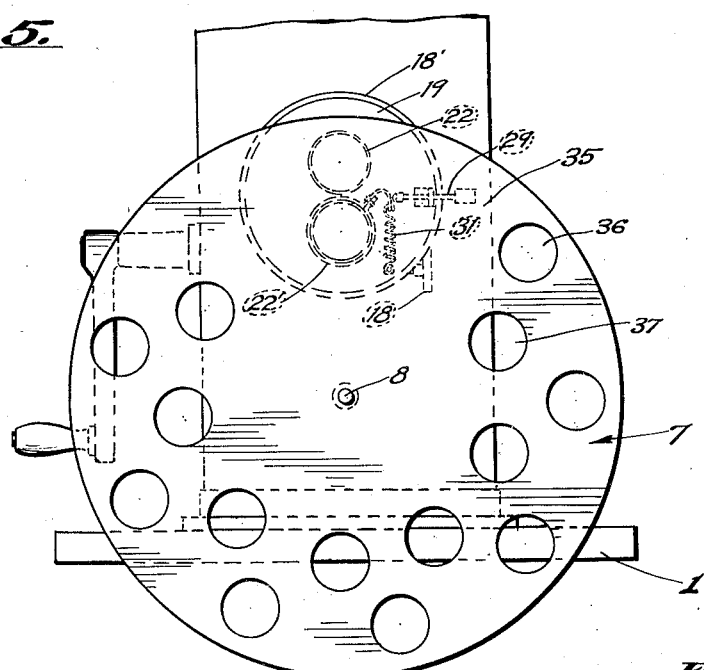
Fig. 5 is a front elevation of the shutter of the projecting apparatus.

The improved projecting apparatus may comprise a usual pedestal 1 having any preferred lamp housing 2 mounted thereon. The film moving casing is shown at 3 as being of usual construction, and is provided with usual upper and lower magazines 4 and 5 for the film reels. The lenses for the apparatus are positioned over the opening through a usual collar 6 extending outwardly from the front of the apparatus, and the shutter 7 rotated in front of said lenses is carried upon a shaft 8. The mechanism employed for intermittently advancing the film strip the usual sixteen times per second and at the same time rotating the shutter of the apparatus between advances of the film strip may be of any suitable construction, and I have therefore not illustrated the same, the parts of the apparatus as thus far described being readily understood by those skilled in the art.

The aperture plate of the projecting machine is shown at 10, said plate being arranged in usual manner to unmask a portion of the film strip which is in alinement with the lenses of the apparatus so that the light in rear of the film strip will be projected through said unmasked portion of the film against the lenses. In the usual construction of the aperture plate the opening therein is arranged to unmask one of the individual frames of the film strip. In my improved apparatus, however, the aperture plate is provided with an opening 11 of such size as to unmask a plurality of the individual frames. In the present embodiment of the invention the opening 11 is adapted to unmask two immediately adjacent individual frames.

The lenses mounted at the opening through collar 6 and in alinement with the frames unmasked by the aperture plate are arranged as two projecting lenses superimposed one above the other. These lenses are prismatic lenses arranged to bend the rays of light passing through the same toward one another so that the two images from the two exposed individual frames projected upon a screen through the upper one of said lenses, will have the image of the lower one of said individual frames superimposed upon the image of the upper one of said frames as projected through the lower one of said superimposed lenses.

As an instance of this arrangement the lenses may be mounted in a sleeve 12 slidably received through collar 6 and adapted to be moved in and out for focusing the lenses. For this purpose the collar 6 may be provided with a longitudinal slot 13 and an outwardly extending bearing recess 14 over said slot. The sleeve 12 is provided with a longitudinal rack 15 projecting through the slot 13 and arranged to be operatively engaged by a pinion 16 fixed upon a shaft 17 journaled in the bearing recess 14 and projecting laterally beyond the same so that a thumb nut 18 carried by said shaft may be manually engaged for rotating the shaft and thus adjusting the longitudinal relation of sleeve 12 within collar 6.

At the outer end of sleeve 12 a radially extending annular flange 17' is provided upon said sleeve. An internally threaded annular collar 18' is threaded upon the periphery of said flange and a disc 19 is threaded at its periphery within the outer end of said collar. The mountings for the lenses are carried by disc 19 which for this purpose is provided with two threaded apertures 20 and 21 arranged to receive the respective lens mountings. The apertures 20—21 are diametrically opposed and are positioned between the center of disc 19 and the periphery thereof in alinement with the opening through sleeve 12 and consequently in alinement with the two unmasked individual frames at the opening in the aperture plate of the machine.

The mountings for the lenses comprise sleeves 22 and 22' threaded upon their outer surfaces for engagement in the threaded apertures 20—21 respectively, so that the lenses carried by said mountings may be rotatably adjusted relatively to one another. The lens carried by each of the lens mountings, preferably, consists of lens cells 23 and 24 arranged at the respective ends of the mountings. These lens cells are shown as plano-convex lenses arranged to enlarge the image projected therethrough in usual manner, and the cell 24 of said lens at the inner end of the lens mounting is a prismatic lens. The lenses carried by the two mountings 22—22' are of the same strength, and the two prismatic lenses 24 are arranged to bend the rays passing through the same equally, so that images projected through the respective lenses will be focused in superimposed relation. In practice the two lenses 24 are, preferably, diametrically opposite portions of one large plano-convex lens.

In practice the sleeve 18 carrying the lens mountings is rotated upon flange 17 until the two lens mountings are exactly in vertical alinement and consequently in exact alinement with the superimposed individual frames exposed to said lenses. The lens mountings are then rotated within disc 19 to bring the thickest portions of the prismatic lenses 24 adjacent one another and in exact vertical diametrical alinement. As an instance of this arrangement one of the lens mountings, say the mounting received in aperture 20, is, preferably, manually rotated to the required position and the other of said lens mountings is then accurately adjusted for positioning the prismatic lenses in the above described relative position. For this purpose a collar 26 is fixed upon the mounting 22' and said collar is provided with a radial extension 27 terminating in an angularly disposed end 28 which is arranged to be impinged by screw rod 29 for turning collar 26 and the lens mounting in the aperture 21. The screw rod may be threaded through a suitable bracket 30 carried by disc 19. The collar 25 is, preferably, yieldably held with its end 28 in contact against the screw rod by means of a spring 31 shown as a coil spring having one end thereof connected to the end 28 of collar 26 and its other end suitably secured as by means of a screw 32 to the disc 19.

The shutter 7 of the machine consists of a disc rotated in the usual manner by shaft 8 so that successive circumferential portions of the disc will continuously pass across the front of the lenses. The shutter comprises a blank sector 35 arranged to mask both the lenses during an advance of the film strip relative to the exposure aperture and the lenses, and openings 36 and 37 arranged circumferentially around the remaining sector of the disc so as to aline respectively with the lenses carried by mountings 22 and 22'. The openings 36 and 37 are arranged one beyond the other in staggered relation circumferentially of the shutter disc so that as the shutter is rotated first one and then the other of the lenses will be unmasked.

In practice, preferably, seven of each of the openings 36 and 37 are provided in the shutter disc, said openings, by their staggered arrangement, being adapted during a rotation of the shutter to first unmask one of the lenses beyond the blank sector 35 and after alternate unmasking of the respective lenses to finally unmask the second of said lenses prior to the subsequent movement of the blank sector 35 across the lenses for masking both of the same.

As previously explained, the prismatic lenses are so arranged that the two images from the two exposed individual frames, as projected through the respective lenses, will have the lower image projected through one lens superimposed upon the upper image projected through the second lens. Means are provided for masking the upper image from the first lens and the lower image from the second lens, so that only the above described superimposed images through the respective lenses are actually projected upon the screen. As an instance of this arrangement a mask 38 is supported by a suitable bracket 39 in front of shutter 7 and in alinement with the lenses. The opening 40 through this mask is of such size and so arranged as to cut off the rays of light forming the images which are not to be projected upon the screen and to permit the passage therethrough of only the rays of light forming the images which appear in superimposed relation upon the screen.

Figure 6:
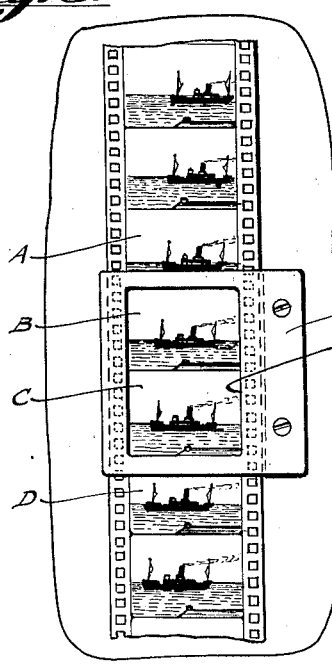
Figs. 6 and 7 are somewhat diagrammatical illustrations of the movement of the film strip with relation to the aperture of the projecting apparatus.
Figure 7:
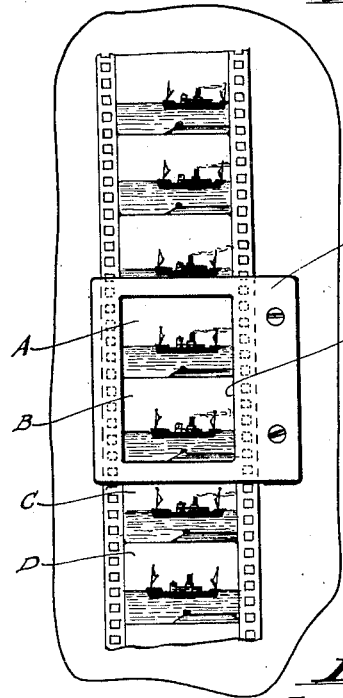

The operation of the improved apparatus will be readily understood by reference to Figs. 1, 6 and 7. In Fig. 6 the two successive individual frames C and B are exposed for projection upon the screen 41 shown in Fig. 1. The lens in mounting 22 will project frame B upon the screen and the lens in mounting 22′ will project frame C in superimposed relation upon the screen. Mask 38 will cut off the image of frame C through lens 22 and the image of frame B through lens 22′. During the stop in the intermittent advance of the film strip with frames B and C exposed, the shutter will make one complete rotation as in the usual practice. As a result the images of frames C and B are alternately projected upon the screen seven times, so that a portion of the background of the scene which is masked by the action in frame C will be alternately unmasked when frame B is exposed, since in the successive frames C and B the position of the action with relation to the background will have changed slightly. The eye will thus rapidly alternately see a portion of the background and then have these same masked by the action, and as a result an optical delusion is produced showing the action of the picture in relief in front of the background.

At the end of a complete rotation of the shutter, blank sector 35 thereof, will mask both lenses, and the film strip is then advanced in usual manner the length of one individual frame, as shown in Fig. 7 so that frames B and A are now exposed. The above described operation is then repeated, the intermittent advance of the film strip producing the optical delusion of motion in usual manner, and the rapid alternate projection of two successive individual frames during each exposure between intermittent advances producing the stereoscopic delusion.

While in the foregoing description, and in the drawings, I have illustrated a particular construction and arrangement of the lenses, it will be obvious that the lenses may be of any preferred construction and arrangement adapted to refract the light passing through the same so as to superimpose the images of the respective frames as previously described. It will also be understood that the shutter construction is similarly subject to various changes within the scope of the invention so long as it provides for the alternate projection of the respective frames a plurality of times between advances of the film strip.

In like manner various changes may be made in the other parts of the apparatus as described without departing from the spirit of the invention.

What is claimed is:

1. A projecting apparatus for moving picture films representing moving objects including means for unmasking two next adjacent individual frames of a film strip, and means for alternately projecting said individual frames in superimposed relation a plurality of times between the successive advances of the film strip, the parts being so arranged that at each advance of said film strip the second of the said to individual frames and the next following individual frame are unmasked.

2. A projecting apparatus for moving picture films representing moving objects including means for unmasking the next adjacent individual frames of a film strip, a plurality of projecting lenses arranged to project said unmasked frames with the image of one frame through one lens in superimposed relation to the image of the second frame through the second lens, and means for alternately projecting upon a screen through the respective lenses a plurality of times between the successive advances of the film, the parts being so arranged that at each advance of said film strip the image of the said second frame will be projected through the first lens in superimposed relation to the image of the next following individual frame projected through the second lens.

3. A projecting apparatus for moving picture films including means for unmasking the next adjacent individual frames of a film strip, a plurality of projecting lenses arranged to project said unmasked frames with the image of one frame through one lens in superimposed relation to the image of the second frame through the second lens, means for masking the image of the second frame through the first lens and the image of the first frame through the second lens, and means for alternately projecting upon a screen through the respective lenses a plurality of times between the successive advances of the film.

In testimony whereof I have signed my name to this specification.

JOHN E. LEONARD.